Dec. 20, 1960 — F. C. BANEY — 2,965,424
COMBINATION LUGGAGE CARRIER AND COLLAPSIBLE TABLE
Filed Jan. 26, 1959 — 2 Sheets-Sheet 1

INVENTOR.
FRED C. BANEY
BY Edward C. Healy
ATTORNEY

Dec. 20, 1960   F. C. BANEY   2,965,424
COMBINATION LUGGAGE CARRIER AND COLLAPSIBLE TABLE
Filed Jan. 26, 1959   2 Sheets-Sheet 2
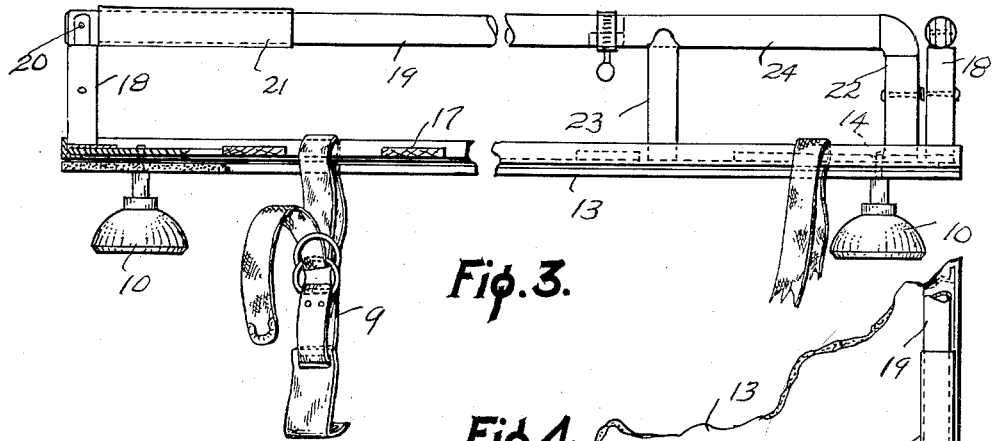
Fig. 3.
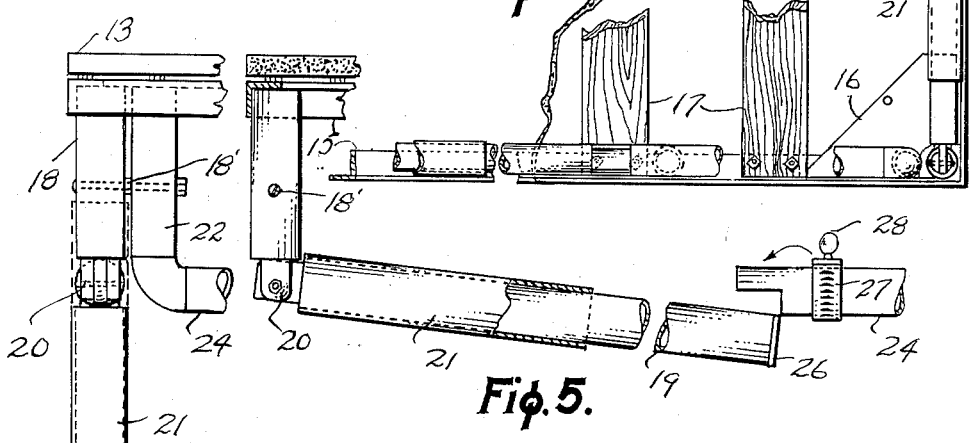
Fig. 4.
Fig. 5.
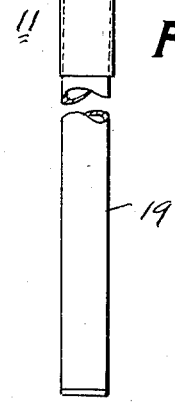
Fig. 6.
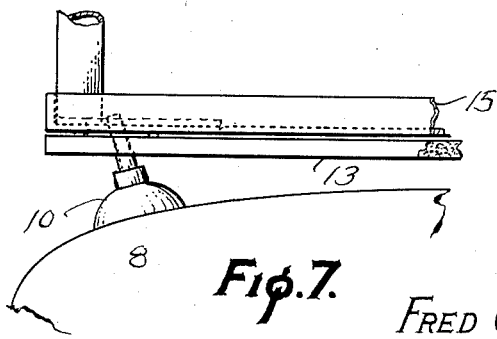
Fig. 7.
INVENTOR.
FRED C. BANEY
BY Edward C. Healy
ATTORNEY

United States Patent Office 2,965,424
Patented Dec. 20, 1960

2,965,424

COMBINATION LUGGAGE CARRIER AND COLLAPSIBLE TABLE

Fred C. Baney, 1310 Carlisle Drive, San Mateo, Calif.

Filed Jan. 26, 1959, Ser. No. 789,026

2 Claims. (Cl. 311—3)

This invention relates to a luggage carrier for use on the top of an automobile, and has particular reference to a luggage carrier adapted to be mounted on the top of an automobile without in any way altering or disfiguring the top of the automobile or subjecting it to any strain for which it was not intended.

The principal object of the invention is the production of a combination luggage carrier and a collapsible table.

Broadly stated the apparatus is in the form of a table top equipped with side flanges from which depend four supporting legs, the said legs when folded serving as side and end guard rails to prevent displacement of the luggage, and said device being provided with vacuum cups and side straps to detachably secure the same to the top of the automobile.

A further object of the invention is the production of a device of the character described that is simple in construction, economical to manufacture, strong, durable, and highly efficient and serviceable in use.

Other objects and advantages will be apparent during the course of the following description.

In the accompanying drawings wherein for the purpose of illustration is shown the preferred embodiment of the invention.

Figure 1:
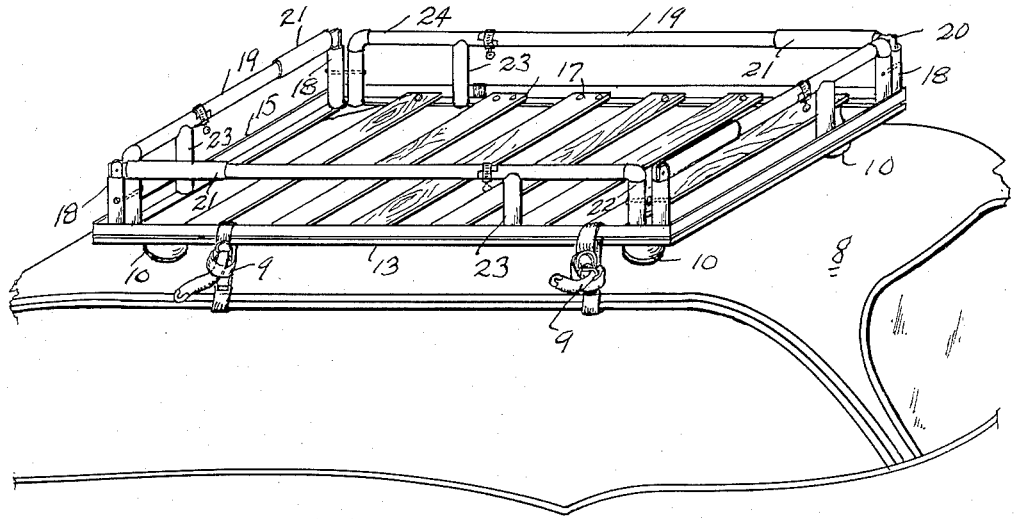
Figure 2:
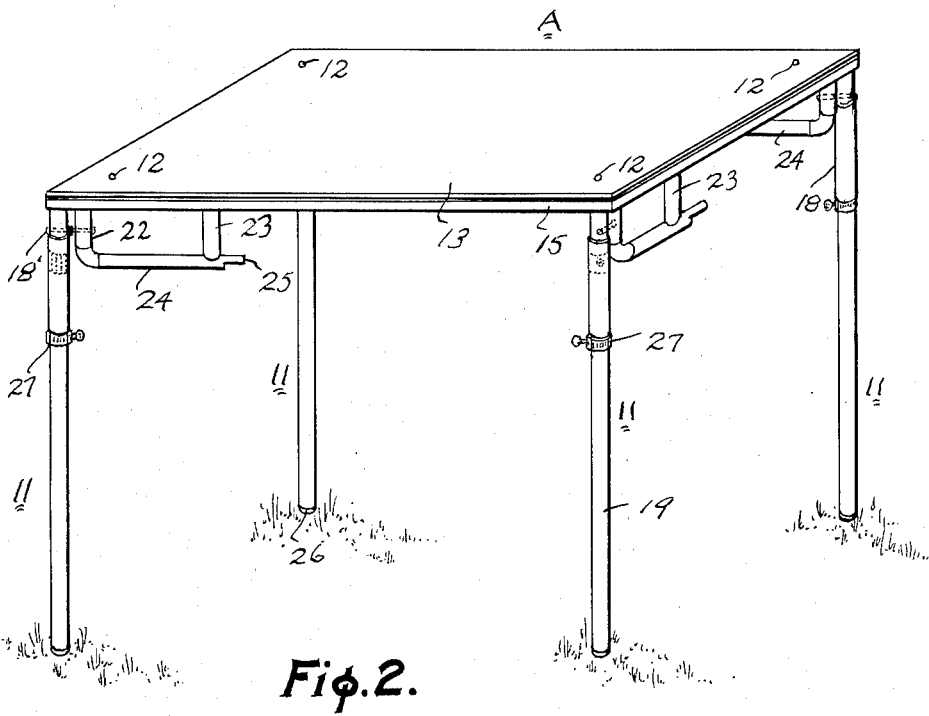

Fig. 1 is a perspective view of the carrier secured in an operative position on the top surface of an automobile with the four legs of the table collapsed and serving as guard rails for the luggage positioned in the carrier, Fig. 2 is a perspective view of the device when used as a table, Fig. 3 is a side view of the device, the view being partly in section and partly in elevation, Fig. 4 is a fragmentary bottom plan view disclosing to advantage the slats and one of the triangular plates of the invention, Fig. 5 is a fragmentary side elevational view of a portion of the leg assembly prior to locking the same, Fig. 6 is a side elevational view of one of the legs in a locked extended position, and Fig. 7 is a fragmentary side elevational view of the car top and disclosing one of the four vacuum cups in contact with the car top.

Referring to the drawings, the numeral 8 designates the top of an automobile to which is secured, by fastening straps 9 and rubber suction or vacuum cups 10, the carrier of the present invention. The straps are four in number and are interposed between the side rails of the carrier and the usual open top gutters on the longitudinal edge of said top. The cups 10 are likewise four in number and are suitably spaced in an inverted position on the car top and cooperate with the straps provided for the proper securing and balancing of the carrier on the roof of the automobile.

As disclosed to advantage in Fig. 1 of the drawing the table is illustrated as mounted in an upside down or inverted position relative to the top of the vehicle with the table legs collapsed and the device in use for carrying luggage and other articles. The legs that are of substantially tubular form are indicated, as a whole, by the numeral 11. In Fig. 2 the four legs are shown as extended to retain the table A in an operative position, after the latter has been removed from the roof of the car and has been set up for use as a card or picnic table. The numeral 12 designates threaded openings provided in the four corners of the table top 13 that removably receive therein threaded shanks 14 of the cups 10.

It will be noted that an angle iron frame 15 of substantially the rectangular form of the table top is secured to a triangular plate 16 bolted at each of the four corners of the undersurface of the table top, the table top 13 being slightly spaced from the frame 15.

The numeral 17 designates wooden spaced transverse slats that are bolted or otherwise secured to the sides of the angle iron frame and serve as reenforcing means for the carrier.

Each leg 11 comprises a top portion 18, that is secured at its upper end to one of the plates 16, and an elongated tubular portion 19 that is hingedly connected, by a pedestal as at 20, to the top portion 18. A sleeve 21 having a frictional fit on the tubular portion 19 is slidably mounted thereon an is adapted to cover the hinge joint to furnish the necessary rigidity to each of the legs when they are extended as shown in Figs. 2 and 6.

Some means must be provided for retaining in a stationary locked position the elongated lower tubular leg portion 19 when the legs are collapsed to provide the guard rails for retaining the articles within the confines of the device when it is used as a carrier for luggage and like articles.

Accordingly, I propose to employ an extension 22 that is bolted at its side as at 18' and is secured at its top to the triangular frame. A grace 23 is spaced from the arm 22 and connected at its upper end to the angle iron frame. A short tubular arm 24 or partial guard rail is suitably connected to the tubular extension 22 and the brace 23. This arm terminates beyond the brace in a curved semi-circular extremity or joint 25 that receives therein for locking engagement therewith the foot or end 26 of the leg portion 19. A slidable clamp 27, equipped with a wing nut 28 is adapted to cover and uncover the slip joint 25, depending on whether it is desired to extend or collapse the legs of the table.

It is to be noted that the legs are of equal length and thus not only provide uniformly constructed guard rails at the sides and ends of the carrier when the legs are collapsed and locked as described, but also assure a level table of corresponding height when the legs are extended to form the table construction of the invention.

It is to be understood that the form of my invention here with shown and described is to be taken as the preferred example of the same and that various changes relative to the size, shape, material and arrangement of parts may be resorted to without departing from the spirit of the invention or the scope of the subjoined claims.

Having thus described my invention, I claim:

1. A combined luggage carrier and collapsible table for mounting upon the top of a motor vehicle body, comprising a rectangular panel forming on one side the bottom of a luggage carrier and at its other side the top of a table when removed from the motor vehicle body, a partial luggage retaining rail extending from each corner and progressively along an adjacent side of said rectangular panel, a leg supporting pedestal at each corner of said panel, a table forming leg hingedly mounted upon each of the said pedestals, a means carried by each of said legs for rendering said hinged connection rigid when said legs are extended to form a table, said leg and said partial guard rail forming members having interlocking extensions at the ends thereof, and means for securing said legs as continuations of said partial guard rails when said panel is employed as a luggage carrier.

2. A combined luggage carrier and collapsible table for mounting upon the top of a motor vehicle body, comprising a rectangular panel forming on one side the bottom of a luggage carrier and at its other side the top of a table when removed from the motor vehicle body, a partial luggage retaining guard rail extending from each corner progressively along an adjacent side of said rectangular panel, a leg supporting pedestal at the opposite corners of said panel, a table forming leg hingedly mounted upon each of said pedestals, a slidable sleeve upon each of said legs adapted to encompass the hinged connection thereof when extended as a table leg, said leg and said partial luggage retaining guard rails having overlapping extensions at the ends thereof, and a clamp for securing said legs as continuations of said partial guard rails when said panel is employed as a luggage carrier.

References Cited in the file of this patent
UNITED STATES PATENTS

| | | | |
|---|---|---|---|
| 1,353,660 | Main | Sept. 21, | 1920 |
| 1,766,085 | Rumer | June 24, | 1930 |
| 2,650,870 | Carpenter | Sept. 1, | 1953 |
| 2,654,516 | Edwards | Oct. 6, | 1953 |
| 2,708,613 | Heckman | May 17, | 1955 |
| 2,746,767 | Evans | May 22, | 1956 |